United States Patent
Ichikawa et al.

(10) Patent No.: US 10,222,796 B2
(45) Date of Patent: Mar. 5, 2019

(54) AUTONOMOUS DRIVING CONTROL APPARATUS

(71) Applicant: TOYOTA JIDOSHA KABUSHIKI KAISHA, Toyota-shi, Aichi-ken (JP)

(72) Inventors: Kentaro Ichikawa, Suntoh-gun (JP); Taisuke Sugaiwa, Susono (JP); Bunyo Okumura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/445,245

(22) Filed: Feb. 28, 2017

(65) Prior Publication Data
US 2017/0315550 A1 Nov. 2, 2017

(30) Foreign Application Priority Data
Apr. 28, 2016 (JP) .................................. 2016-090476

(51) Int. Cl.
*G05D 1/00* (2006.01)

(52) U.S. Cl.
CPC ......... *G05D 1/0061* (2013.01); *G05D 1/0088* (2013.01)

(58) Field of Classification Search
CPC ... G05D 1/0061; G05D 1/0088; B60W 50/10; B60W 50/082; B60W 2540/04; B60W 2050/007; B60W 2050/0071; B60W 2050/0072; B60W 2050/0073; B60W 2050/0074; B60W 30/182; B60K 2310/20
USPC ...... 701/1, 23, 36, 41, 93, 96, 117, 301, 538
See application file for complete search history.

(56) References Cited

U.S. PATENT DOCUMENTS

| 5,558,163 | A | * | 9/1996 | Hollstein | ............... | A01B 67/00 172/2 |
| 8,260,482 | B1 | * | 9/2012 | Szybalski | ............. | B62D 1/286 701/23 |
| 8,670,891 | B1 | * | 3/2014 | Szybalski | ............. | B62D 1/286 701/23 |

(Continued)

FOREIGN PATENT DOCUMENTS

| JP | 2016-24541 A | 2/2016 |
| JP | 2017-24521 A | 2/2017 |

OTHER PUBLICATIONS

U.S. Appl. No. 15/413,568.

*Primary Examiner* — Richard A Goldman
(74) *Attorney, Agent, or Firm* — Sughrue Mion, PLLC

(57) ABSTRACT

An autonomous driving control apparatus executes an autonomous driving control of a vehicle. The autonomous driving control apparatus includes: a first determination unit configured to determine whether the autonomous driving control can be engaged or not; an autonomous driving control engage trigger input unit; a triggered engage mode configured to engage the autonomous driving control when an autonomous driving control engage trigger is input by a driver to the autonomous driving control engage trigger input unit after the first determination unit determines that the autonomous driving control can be engaged; an automatic engage mode configured to automatically engage the autonomous driving control when the first determination unit determines that the autonomous driving control can be engaged; and a switching unit configured to switch between the triggered engage mode and the automatic engage mode.

10 Claims, 7 Drawing Sheets

(56) References Cited

U.S. PATENT DOCUMENTS

| | | | |
|---|---|---|---|
| 8,818,608 B2* | 8/2014 | Cullinane | B60W 30/00 701/23 |
| 9,616,896 B1* | 4/2017 | Letwin | B60W 30/182 |
| 9,802,623 B2* | 10/2017 | Sugaiwa | B60W 50/12 |
| 9,855,894 B1* | 1/2018 | Khorasani | B60R 1/00 |
| 2004/0129476 A1* | 7/2004 | Matsuno | B60K 23/0808 180/247 |
| 2010/0179715 A1* | 7/2010 | Puddy | G05D 1/0061 701/23 |
| 2011/0196584 A1* | 8/2011 | Fox | F16H 61/0202 701/51 |
| 2013/0197772 A1* | 8/2013 | Brand | B60K 17/356 701/82 |
| 2014/0249722 A1* | 9/2014 | Hegemann | G08G 1/16 701/41 |
| 2015/0149088 A1* | 5/2015 | Attard | G01C 21/36 701/538 |
| 2015/0314780 A1* | 11/2015 | Stenneth | B60W 30/00 701/23 |
| 2015/0321553 A1* | 11/2015 | Pritchard | F16H 61/0206 192/48.601 |
| 2016/0334230 A1* | 11/2016 | Ross | G01C 21/3415 |
| 2017/0110022 A1* | 4/2017 | Gulash | G09B 9/052 |
| 2017/0113687 A1* | 4/2017 | Gordon | H04W 4/046 |
| 2017/0249844 A1* | 8/2017 | Perkins | B60W 50/0097 |
| 2017/0261974 A1* | 9/2017 | Ebe | G05D 1/0005 |
| 2017/0261981 A1* | 9/2017 | Ichikawa | G05D 1/0061 |
| 2017/0341661 A1* | 11/2017 | Nishiyama | B60W 50/0098 |
| 2017/0363430 A1* | 12/2017 | Al-Dahle | G01C 21/32 |
| 2018/0208211 A1 | 7/2018 | Chiba | |

* cited by examiner

AUTONOMOUS DRIVING CONTROL APPARATUS

BACKGROUND

Technical Field

The present invention relates to an autonomous driving control apparatus.

Background Art

An autonomous driving control apparatus that executes an autonomous driving control of a vehicle is conventionally known. An example of such the autonomous driving control apparatus is disclosed in Patent Literature 1.

According to a method of the autonomous driving control described in Patent Literature 1, it is first determined that a control computer is ready to execute the autonomous driving control of a vehicle, and then a user (driver) is notified of it. After that, the user (driver) inputs a first input indicating that the user is ready. In response to the first input, the autonomous driving control is engaged (activated, started).

LIST OF RELATED ART

Patent Literature 1: U.S. Pat. No. 8,670,891

SUMMARY

As described above, according to the autonomous driving control apparatus disclosed in Patent Literature 1, the first input indicating that the user (driver) is ready is necessary for engaging the autonomous driving control. Therefore, in the case of the autonomous driving control apparatus disclosed in Patent Literature 1, an operation by the user (driver) for engaging the autonomous driving control becomes complicated.

Considering a driver who does not desire such the complicated operation, it is necessary to reduce the complication of the driver's operation at a time of engaging the autonomous driving control.

On the other hand, if a driver desires to execute manual driving, the driver does not desire that the autonomous driving control is automatically engaged. That is, there are some drivers who do not desire the autonomous driving control to be engaged automatically.

The present invention has been made to solve the problem described above. An object of the present invention is to provide an autonomous driving control apparatus that can meet both the demand of the driver who desires the autonomous driving control to be engaged without a complicated operation and the demand of the driver who does not desire the autonomous driving control to be engaged automatically.

That is, an object of the present invention is to provide an autonomous driving control apparatus that can establish user interfaces respectively suitable for drivers having different demands.

In an aspect of the present invention, an autonomous driving control apparatus that executes an autonomous driving control of a vehicle is provided.

The autonomous driving control apparatus includes:
a first determination unit configured to determine whether the autonomous driving control can be engaged or not;
an autonomous driving control engage trigger input unit;
a triggered engage mode configured to engage the autonomous driving control when an autonomous driving control engage trigger is input by a driver to the autonomous driving control engage trigger input unit after the first determination unit determines that the autonomous driving control can be engaged;
an automatic engage mode configured to automatically engage autonomous driving control when the first determination unit determines that the autonomous driving control can be engaged; and
a switching unit configured to switch between the triggered engage mode and the automatic engage mode.

That is, the autonomous driving control apparatus according to the present invention is provided with the automatic engage mode that automatically engages (activates, starts) the autonomous driving control.

Therefore, according to the autonomous driving control apparatus of the present invention, it is possible to automatically engage the autonomous driving control. In another word, it is possible to engage the autonomous driving control without an input of the autonomous driving control engage trigger by the driver.

Consequently, according to the autonomous driving control apparatus of the present invention, it is possible to reduce the complication of the driver's operation at the time of engaging the autonomous driving control and improve operability for engaging the autonomous driving control, as compared with the conventional autonomous driving control apparatus disclosed in Patent Literature 1 where the first input indicating that the user (driver) is ready is necessary for engaging the autonomous driving control.

On the other hand, if a driver desires to execute manual driving, the driver does not desire that the autonomous driving control is automatically engaged. That is, there are some drivers who do not desire the autonomous driving control to be engaged automatically.

In view of the above, the autonomous driving control apparatus according to the present invention is provided also with the triggered engage mode separately from the automatic engage mode. The triggered engage mode engages the autonomous driving control when the autonomous driving control engage trigger is input by the driver after it is determined that the autonomous driving control can be engaged. That is, in the triggered engage mode, the autonomous driving control is not engaged unless the autonomous driving control engage trigger is input by the driver.

Furthermore, the autonomous driving control apparatus according to the present invention is provided with the switching unit for switching between the triggered engage mode and the automatic engage mode.

That is, according to the autonomous driving control apparatus of the present invention, when a driver does not desire the autonomous driving control to be engaged. automatically, for example, the driver selects the triggered engage mode through the switching unit. As a result, the autonomous driving control is prevented from being engaged automatically. The autonomous driving control is engaged only when the autonomous driving control engage trigger is input by the driver after it is determined that the autonomous driving control can be engaged.

Thus, according to the autonomous driving control apparatus of the present invention, it is possible to suppress a problem that the autonomous driving control is engaged automatically even though the driver desires to execute the manual driving.

In this manner, according to the autonomous driving control apparatus of the present invention, it is possible to meet both the demand of the driver who desires the autonomous driving control to be engaged without the input of the autonomous driving control engage trigger by the driver and the demand of the driver who does not desire the autonomous driving control to be engaged automatically. As a result, it is possible to establish user interfaces respectively suitable for drivers having different demands.

In other words, according to the autonomous driving control apparatus of the present invention, the driver can switch and use the different two modes: the triggered engage mode where the driver determines a timing of engaging the autonomous driving control; and the automatic engage mode where the autonomous driving control apparatus determines the timing of engaging the autonomous driving control.

In the autonomous driving control apparatus according to the present invention, a determination criterion used by the first determination unit for determining that the autonomous driving control can be engaged may be less likely to be met when the automatic engage mode is selected than when the triggered engage mode is selected.

That is, according to the autonomous driving control apparatus of the present invention, it is more likely to be determined that the autonomous driving control can be engaged when the triggered engage mode is selected than when the automatic engage mode is selected. Therefore, when the triggered engage mode is selected, a period of time when it is determined that the autonomous driving control can be engaged becomes longer than when the automatic engage mode is selected. As a result, the driver has enough time for inputting the autonomous driving control engage trigger. The autonomous driving control is more likely to be engaged according to the driver's demand.

According to the present invention, it is possible to meet both the demand of the driver who desires the autonomous driving control to be engaged without a complicated operation and the demand of the driver who does not desire the autonomous driving control to be engaged automatically.

EMBODIMENTS

First Embodiment

Figure 1:
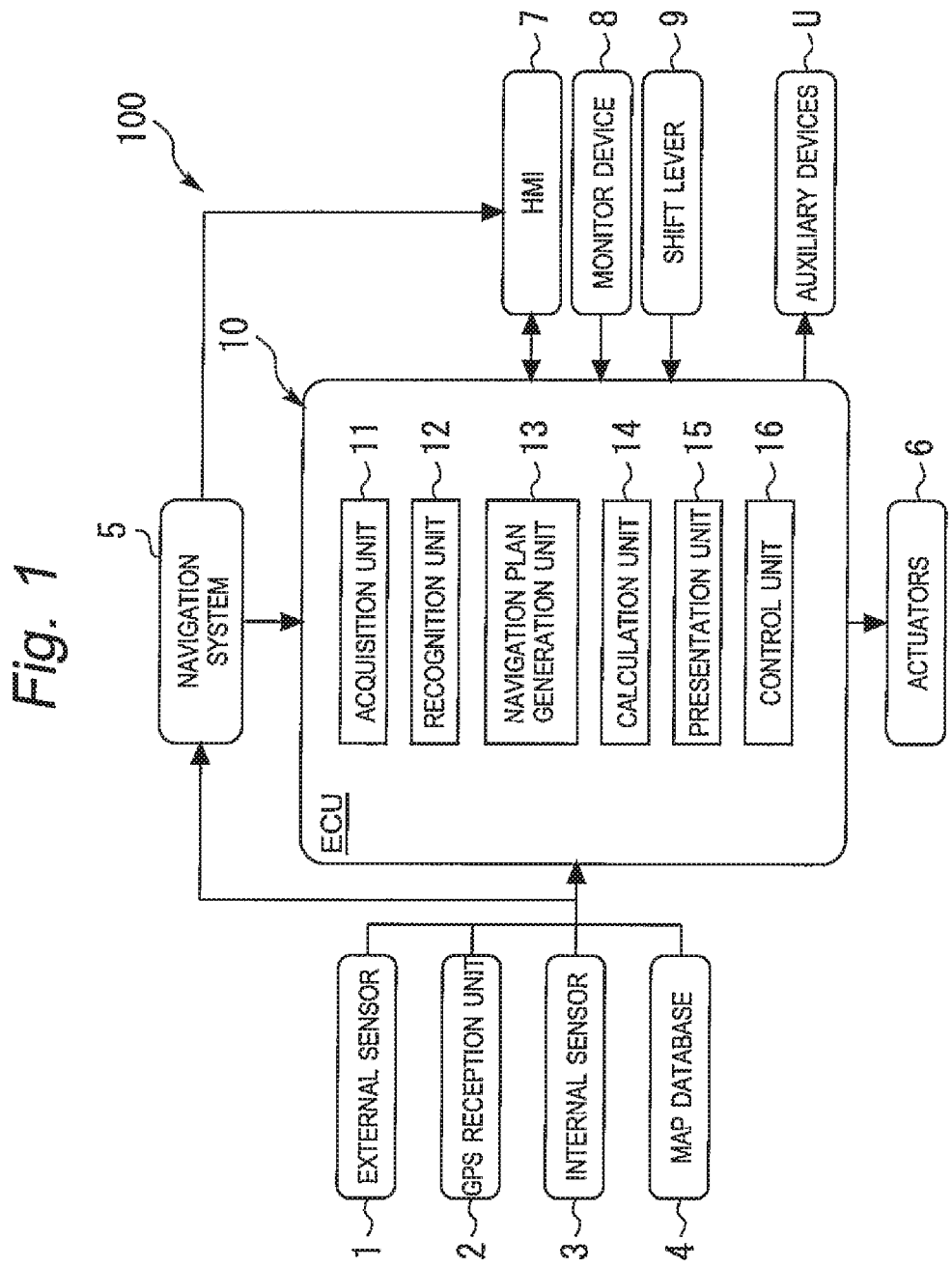
FIG. 1 is a schematic configuration diagram of an autonomous driving control apparatus according to a first embodiment.

A first embodiment of an autonomous driving control apparatus according to the present invention will be described hereinafter. FIG. 1 is a schematic configuration diagram of the autonomous driving control apparatus according to the first embodiment.

In the example shown in FIG. 1, the autonomous driving control apparatus 100 is installed in a vehicle (not shown) such as a passenger car. The autonomous driving control apparatus 100 executes an autonomous driving control of the vehicle. Here, the autonomous driving control means a control that executes driving operations such as acceleration, deceleration and steering of the vehicle without depending on driving operations by a driver of the vehicle.

The autonomous driving control includes a lane keeping assist control as an example. In the lane keeping assist control, a steering wheel (not shown) is steered automatically (namely, without depending on a steering operation by the driver) such that the vehicle does not depart from a running lane. That is, in the lane keeping assist control, the steering wheel is automatically steered such that the vehicle runs along the running lane, even when the driver does not perform any steering operation.

The autonomous driving control includes a navigation control as another example. In the navigation control, when there is no preceding vehicle in front of the vehicle, a constant speed control to make the vehicle run at a predetermined constant speed is executed. When there is a preceding vehicle in front of the vehicle, a follow-up control to adjust a vehicle speed according to a distance between the vehicle and the preceding vehicle is executed.

In the example shown in FIG. 1, switching from the autonomous driving control to manual driving may be executed. Whether or not to execute the switching from the autonomous driving control to the manual driving is determined based on a comparison between a comparison target and a threshold. Here, the comparison target is quantified so as to be compared with the threshold. When the comparison target is equal to or more than the threshold, the autonomous driving control apparatus 100 executes the switching from the running autonomous driving control to the manual driving.

For example, when an operation amount of any of a steering operation, an acceleration operation, and a brake operation by the driver of the vehicle during the autonomous driving control becomes equal to or more than a threshold, the autonomous driving control apparatus 100 executes the switching from the running autonomous driving control to the manual driving. Note that a steering work amount is included in the operation amount. Such the steering work amount is described in detail in a patent literature JP 2015-063244, for example.

The manual driving is a driving status that makes the vehicle run in accordance mainly with a driving operation by the driver. For example, the manual driving includes a driving status that makes the vehicle run in accordance only with a driving operation by the driver. Moreover, the manual driving includes a driving status in which the vehicle runs in accordance mainly with a driving operation by the driver while a driving operation support control that supports the driving operation by the driver is additionally performed.

Examples of the driving operation support control performed during the manual driving are as follows. The driver actively performs any of a steering operation, an acceleration operation, and a brake operation of the vehicle, while the autonomous driving control apparatus 100 performs any of the steering operation, the acceleration operation, and the brake operation of the vehicle that is not performed by the driver. As another example, the driving operation support control adds or subtracts an operation amount to or from the operation amount of the manual driving (steering, acceleration, or deceleration) that is performed by the driver.

In the example shown in FIG. 1, the autonomous driving control apparatus 100 is provided with an external sensor 1, an GPS (Global Positioning System) reception unit 2, an internal sensor 3, a map database 4, a navigation system 5, actuators 6, an HMI (Human Machine Interface) 7, a monitor device 8, a shift lever 9, auxiliary devices U, and an ECU (Electronic Control Unit) 10.

In the example shown in FIG. 1, the external sensor 1 is a detector that detects external circumstances as surrounding information of the vehicle. The external sensor 1 includes at least one of a camera, a radar, and a LIDAR (Laser Imaging Detection and Ranging).

The camera is an imaging device that images the external circumstances surrounding the vehicle. For example, the camera is provided on a back side of a front windshield of the vehicle. The camera may be a monocular camera or a stereo camera. For example, the stereo camera has two imaging units arranged to recreate binocular disparity. Image information obtained by the stereo camera includes information in a depth direction. The camera outputs, to the ECU 10, image information on the external circumstances surrounding the vehicle. The camera is not limited to a visible camera but can be an infrared camera.

The radar uses radio waves to detect obstacles outside of the vehicle. For example, the radio wave is millimeter wave. The radar transmits the radio waves to the surroundings of the vehicle and receives reflected radio waves from an obstacle to detect the obstacle. For example, the radar can detect, as obstacle information regarding the obstacle, a distance to the obstacle or a direction toward the obstacle. The radar outputs the detected obstacle information to the ECU 10. When performing a sensor fusion, the radar may output, to the ECU 10, reception information of the reflected radio waves.

The LIDAR uses lights to detect obstacles outside of the vehicle. The LIDAR transmits a light to the surroundings of the vehicle and receives reflected light from an obstacle to measure a distance to the reflected point and detect the obstacle. For example, the LIDAR can detect, as obstacle information regarding the obstacle, a distance to the obstacle or a direction toward the obstacle. The LIDAR outputs the detected obstacle information to the ECU 10. When performing a sensor fusion, the LIDAR may output, to the ECU 10, reception information of the reflected lights. Note that the camera, the radar, and the LIDAR do not necessarily need to be used redundantly.

In the example shown in FIG. 1, the GPS reception unit 2 receives signals from three or more GPS satellites to obtain position information indicating a position of the vehicle. For example, the position information includes latitude information and longitude information. The GPS reception unit 2 outputs the measured position information of the vehicle to the ECU 10.

As another example, another means for identifying a latitude and a longitude of a position of the vehicle may be used instead of the GPS reception unit 2.

In the example shown in FIG. 1, the internal sensor 3 is a detector for detecting information depending on a running status of the vehicle and the operation amount of any of the steering operation, the acceleration operation, and the brake operation by the driver of the vehicle (the above-mentioned steering work amount is included in the operation amount). The internal sensor 3 includes at least one of a vehicle speed sensor, an acceleration sensor, and a yaw rate sensor for detecting the information depending on the running status of the vehicle. Moreover, the internal sensor 3 includes at least one of a steering sensor, an accelerator pedal sensor, and a brake pedal sensor for detecting the operation amount.

The vehicle speed sensor is a detector that detects a speed of the vehicle. For example, a wheel speed sensor is used as the vehicle speed sensor. The wheel speed sensor is provided to a wheel of the vehicle or a drive shaft rotating together with the wheel and detects a rotational speed of the wheel. The vehicle speed sensor outputs, to the ECU 10, vehicle speed information wheel speed information) including the speed of the vehicle.

The acceleration sensor is a detector that detects an acceleration of the vehicle. For example, the acceleration sensor includes a longitudinal acceleration sensor for detecting a longitudinal acceleration of the vehicle and a lateral acceleration sensor for detecting a lateral acceleration of the vehicle. The acceleration sensor outputs, to the ECU 10, acceleration information including the acceleration of the vehicle.

The yaw rate sensor is a detector that detects a yaw rate (rotation angular velocity) around a vertical axis passing through the center of gravity of the vehicle. For example, a gyro sensor is used as the yaw rate sensor. The yaw rate sensor outputs, to the ECU 10, yaw rate information including the yaw rate of the vehicle.

The steering sensor is a detector that detects a steering operation amount of a steering operation with respect to the steering wheel 30 (see FIG. 7) by the driver of the vehicle. The steering operation amount detected by the steering sensor is a steering angle of the steering wheel 30 or a steering torque applied to the steering wheel 30, for example. The steering sensor is provided to a steering shaft of the vehicle, for example. The steering sensor outputs, to the ECU 10, information including the steering angle of the steering wheel 30 or the steering torque applied to the steering wheel 30.

Figure 6:
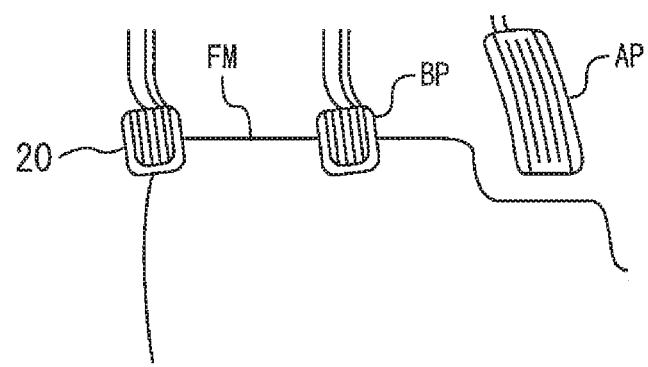
FIG. 6 is a diagram showing a mode switching pedal 20 and so forth of the autonomous driving control apparatus according to a third embodiment.

The accelerator pedal sensor is a detector that detects a stroke amount of an accelerator pedal AP (see FIG. 6). The stroke amount of the accelerator pedal AP is, for example, a pedal position of the accelerator pedal AP with respect to a reference position. The reference position may be a fixed position or a variable position depending on a predetermined parameter. The accelerator pedal sensor is provided to a shaft portion of the accelerator pedal AP of the vehicle, for example. The accelerator pedal sensor outputs, to the ECU 10, operation information depending on the stroke amount of the accelerator pedal AP.

The brake pedal sensor is a detector that detects a stroke amount of a brake pedal BP (see FIG. 6). The stroke amount of the brake pedal BP is, for example, a pedal position of the brake pedal BP with respect to a reference position. The reference position may be a fixed position or a variable position depending on a predetermined parameter. The brake pedal sensor is provided to a shaft portion of the brake pedal BP, for example. The brake pedal sensor may detect an operation force of the brake pedal BP (e.g. force on the brake pedal BP, oil pressure of a master cylinder, and so force). The brake pedal sensor outputs, to the ECU 10, operation information depending on the stroke amount or the operation force of the brake pedal BP.

In the example shown in FIG. 1, the map database 4 is a database including map information. The map database 4 is implemented, for example, in an HDD (Hard Disk Drive) installed in the vehicle. The map information includes road position information, road shape information, intersection position information, and fork position information, for example. The road shape information includes a road type such as a curve and a straight line, and a curvature of the curve. When the autonomous driving control apparatus 100 uses a SLAM (Simultaneous Localization and Mapping) technology or position information of blocking structural objects such as buildings and walls, the map information may further include an output signal from the external sensor 1.

As another example, the map database 4 may be constructed in a computer in a facility such as an information processing center with which the vehicle can communicate.

In the example shown in FIG. 1, the navigation system 5 is a device that guides the driver of the vehicle to a destination on the map designated by the driver of the vehicle.

The navigation system 5 calculates a route in which the vehicle runs, based on the position information of the vehicle measured by the GPS reception unit 2 and the map information of the map database 4. The route may indicate a running lane in which the vehicle runs in a section having a plurality of lanes, for example. The navigation system 5 calculates a target route from the current position of the vehicle to the destination, and notifies the driver of the target route through a display 5a (see FIG. 8) and a speaker (audio output) for example. The navigation system 5 outputs, to the ECU 10, information of the target route for the vehicle.

In the example shown in FIG. 1, the navigation system 5 uses the position information of the vehicle measured by the GPS reception unit 2 and the map information of the map database 4. In another example, the navigation system 5 may use information stored in a computer in a facility such as an information processing center with which the vehicle can communicate. A part of the processing executed by the navigation system 5 may be executed by the computer in the facility.

In the example shown in FIG. 1, the actuators 6 are devices that execute running controls of the vehicle. The actuators 6 include at least a throttle actuator, a brake actuator, and a steering actuator.

In the example shown in FIG. 1, the throttle actuator controls, in accordance with a control signal output from the ECU 10, an air amount supplied to an engine (i.e. throttle opening) to control a driving force of the vehicle.

In another example where the vehicle is an electric vehicle, the actuators 6 may not include the throttle actuator but include a motor as a power source. A control signal is supplied from the ECU 10 to the motor, and thereby the driving force is controlled.

The brake actuator controls, in accordance with a control signal output from the ECU 10, a brake system to control a braking force applied to each wheel of the vehicle. For example, a hydraulic brake system can be used as the brake system.

The steering actuator controls, in accordance with a control signal output from the ECU 10, driving of an assist motor of an electric power steering system that controls the steering torque. Thus, the steering actuator controls the steering torque of the vehicle.

In the example shown in FIG. 1, the HMI 7 is an interface used for communicating information between an occupant (including the driver) in the vehicle and the autonomous driving control apparatus 100. For example, the HMI 7 includes a display panel for displaying image information for the occupant, a speaker for outputting audio information, and operation buttons or a touch panel used by the occupant for performing an input operation. The HMI 7 may transmit the information to the occupant through a mobile information terminal connected wirelessly and receive the input operation by the occupant through the mobile information terminal.

In the example shown in FIG. 1, the monitor device 8 monitors a status of the driver. The monitor device 8 can check a manual driving preparation state of the driver. More specifically, the monitor device 8 can check, for example, whether or not the driver is ready to start the manual driving. Moreover, the monitor device 8 can check, for example, whether or not the driver has an intention to execute the manual driving.

For example, the monitor device 8 is a camera that can take an image of the driver. In this case, for example, the camera is used for estimating an eye-opening degree and an eye direction of the driver. As another example, the monitor device 8 can be a camera that takes an image of a hand of the driver. In this case, whether or not the driver holds the steering wheel 30 (see FIG. 7) is detected by an image analysis. As still another example, the monitor device 8 can be a touch sensor (strain sensor) that detects strength of force of holding the steering wheel 30, as described in Patent Literature JP H11-091397 for example.

In the example shown in FIG. 1, the shift lever 9 (see FIGS. 5A and 5B) is configured to be positioned at a shift position "A (AUTOMATIC)" and a shift position "D (DRIVE)". The shift position "A" indicates the automatic engage mode where the autonomous driving control is engaged automatically. The shift position "D" indicates the triggered engage mode where the autonomous driving control is engaged in response to an input of an autonomous driving control engage trigger by the driver.

In the example shown in FIG. 1, the auxiliary devices U include devices that can be operated by the driver of the vehicle. The auxiliary devices U include a collection of devices that are not included in the actuators 6.

In the example shown in FIG. 1, the auxiliary devices U include a direction indicator, a headlight, a windshield wiper and the like.

In the example shown in FIG. 1, the ECU 10 (controller) executes the autonomous driving control of the vehicle. The ECU 10 has a CPU (Central Processing Unit), a ROM (Read Only Memory), a RAM (Random Access Memory) and the like.

In the example shown in FIG. 1, the ECU 10 (controller) includes an acquisition unit 11, a recognition unit 12, a navigation plan generation unit 13, a calculation unit 14, a presentation unit 15, and a control unit 16. In the ECU 10, a program stored in the ROM is loaded onto the RAM and executed by the CPU, and thereby controls by the acquisition unit 11 and the like are executed. The ECU 10 may consist of a plurality of electric control units.

In the example shown in FIG. 1, the acquisition unit 11 obtains the following operation amounts based on the information obtained by the internal sensor 3: the operation amounts of the steering operation, the acceleration operation, and the brake operation by the driver of the vehicle during the autonomous driving control; and the operation amounts of the steering operation, the acceleration operation, and the brake operation by the driver of the vehicle during the manual driving. The above-mentioned steering work amount is included in the operation amount. As an example, the operation amounts are the steering angle of the steering wheel 30 (see FIG. 7), the steering torque applied to the steering wheel 30, the steering work amount, the stroke amount of the accelerator pedal AP (see FIG. 6), the stroke amount of the brake pedal BP (see FIG. 6), and the operation force of the brake pedal BP. As another example, the operation amounts are duration times during which the steering angle of the steering wheel 30, the steering torque applied to the steering wheel 30, the stroke amount of the accelerator pedal AP, the stroke amount of the brake pedal BP, and the operation force of the brake pedal BP are equal to or more than predetermined thresholds, respectively.

In the example shown in FIG. 1, the recognition unit 12 recognizes an environment surrounding the vehicle, based on the information obtained by the external sensor 1, the GPS reception unit 2, and the map database 4. For example, the recognition unit 12 includes an obstacle recognition unit (not shown), a road width recognition unit (not shown), and a facility recognition unit (not shown).

The obstacle recognition unit recognizes, based on the information obtained by the external sensor 1, obstacles surrounding the vehicle as the environment surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle means a property of the obstacle such as hardness and a shape of the obstacle.

The road width recognition unit recognizes, based on the information obtained by the external sensor 1, the GPS reception unit 2, and the map database 4, a road width of a road in which the vehicle is running, as the environment surrounding the vehicle.

The facility recognition unit recognizes, based on the map information obtained from the map database 4 and the vehicle position information obtained by the GPS reception unit 2, whether or not the vehicle is running in any of an intersection and a parking, as the environment surrounding the vehicle. The facility recognition unit may recognize, based on the map information and the vehicle position information, whether or not the vehicle is running in a school zone, near a childcare facility, near a school, or near a park, as the environment surrounding the vehicle.

In the example shown in FIG. 1, the navigation plan generation unit 13 generates a navigation plan for the vehicle, based on the target route calculated by the navigation system 5, the information on the obstacles surrounding the vehicle recognized by the recognition unit 12, and the map information obtained from the map database 4.

The navigation plan is a track of the vehicle in the target route. For example, the navigation plan includes a speed, an acceleration, a deceleration, a direction, and a steering angle of the vehicle at each time.

The navigation plan generation unit 13 generates the navigation plan such that the vehicle runs on the target route while satisfying criteria of safety, legal compliance, a running efficiency and the like. Moreover, based on the situation of the obstacles surrounding the vehicle, the navigation plan generation unit 13 generates the navigation plan for the vehicle so as to avoid contact with the obstacles.

In the example shown in FIG. 1, the calculation unit 14 calculates a threshold used for determining whether or not to execute switching from the autonomous driving control to the manual driving. The determination is performed based on the operation amount of the driving operation by driver of the vehicle during the autonomous driving control which is obtained by the acquisition unit 11. The above-mentioned steering work amount is included in the operation amount.

For example, the ECU 10 stores a function of the threshold used for determining whether or not to execute the switching from the autonomous driving control to the manual driving and the operation amount of the driving operation by driver of the vehicle. The function is used by the calculation unit 14 for calculating the threshold used for determining whether or not to execute the switching from the autonomous driving control to the manual driving.

Moreover, for example, the ECU 10 stores a function of a threshold used for determining whether or not the autonomous driving control can be engaged and the operation amount of the driving operation by driver of the vehicle. The function is used by the calculation unit 14 for calculating the threshold used for determining whether or not the autonomous driving control can be engaged.

In the example shown in FIG. 1, the presentation unit 15 displays, on a display of the HMI 7, the threshold which is calculated by the calculation unit 14 and used for determining whether or not to execute the switching from the autonomous driving control to the manual driving.

More specifically, during the autonomous driving control for example, the presentation unit 15 displays the threshold used for determining whether or not to execute the switching from the autonomous driving control to the manual driving.

Moreover, in the example shown in FIG. 1, the presentation unit 15 displays, on the display of the HMI 7, the threshold which is calculated by the calculation unit 14 and used for determining whether or not the autonomous driving control can be engaged.

More specifically, during the manual driving for example, the presentation unit 15 displays the threshold used for determining whether or not the autonomous driving control can be engaged.

In the example shown in FIG. 1, the control unit 16 automatically controls driving of the vehicle based on the navigation plan generated by the navigation plan generation unit 13. The control unit 16 outputs, to the actuators 6, control signals according to the navigation plan. That is, the control unit 16 controls the actuators 6 based on the navigation plan, and thereby the autonomous driving control of the vehicle is executed.

Moreover, when the operation amount of the driving operation by the driver, which is obtained by the acquisition unit 11, becomes equal to or more than the threshold calculated by the calculation unit 14 in a period during which the autonomous driving control is in execution, the control unit 16 executes the switching from the autonomous driving control to the manual driving.

Figure 2:
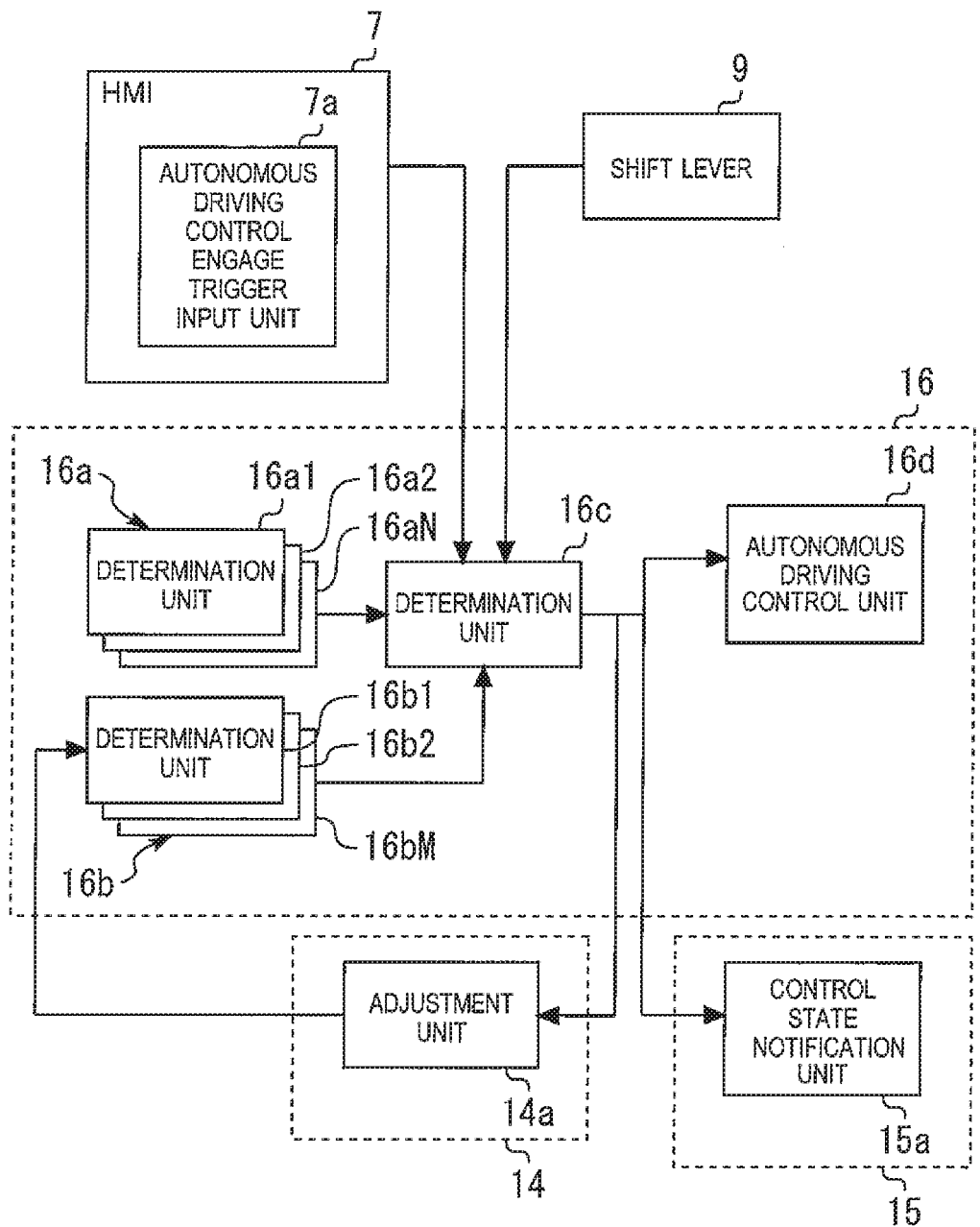
FIG. 2 is a diagram for explaining a characteristic part of the autonomous driving control apparatus according to the first embodiment.

FIG. 2 is a diagram for explaining a characteristic part of the autonomous driving control apparatus according to the first embodiment.

In the example shown in FIG. 2, the control unit 16 is provided with a determination unit 16a that determines whether or not the autonomous driving control apparatus 100 can engage (activate, start) the autonomous driving control. For example, the determination unit 16a includes N determination units 16a1, 16a2, . . . , and 16aN. For example, the determination unit 16a performs the following determination with respect to information different from the driver's intention.

For example, the determination unit 16a1 determines whether or not the autonomous driving control can be engaged, based on a difference between a vehicle position calculated from signals received by the GPS reception unit 2 (see FIG. 1) and an actual vehicle position calculated based on an output signal from the external sensor 1 (see FIG. 1), the map information of the map database 4 (see FIG. 1) and so forth.

For example, the determination unit 16a2 determines whether or not the autonomous driving control can be engaged, based on a curvature of a road on which the vehicle is running.

When all the N determination units 16a1, 16a2, ..., and 16aN determine that the autonomous driving control can be engaged, the determination unit 16a determines that the autonomous driving control can be engaged.

In the example shown in FIG. 2, the determination unit 16a serves as a "first determination unit" that determines whether or not the autonomous driving control can be engaged.

In the example shown in FIG. 2, the control unit 16 is further provided with a determination unit 16b that determines whether or not a trigger to deactivate (stop) the autonomous driving control exists. For example, the determination unit 16b includes M determination units 16b1, 16b2, ..., and 16bM. For example, the determination unit 16b performs the following determination with respect to a driver's operation performed on a voluntary basis.

For example, the determination unit 16b1 determines whether or not to execute the switching from the autonomous driving control to the manual driving, based on the operation amount of steering by the driver of the vehicle during the autonomous driving control which is obtained by the acquisition unit 11 (see FIG. 1). The above-mentioned steering work amount is included in the operation amount.

For example, the determination unit 16b2 determines whether or not to execute the switching from the autonomous driving control to the manual driving, based on the operation amount of acceleration or deceleration by the driver of the vehicle during the autonomous driving control which is obtained by the acquisition unit 11.

When at least one of the M determination units 16b1, 16b2, ..., and 16bM determines that the switching from the autonomous driving control to the manual driving should be executed, the determination unit 16b determines that the switching from the autonomous driving control to the manual driving should be executed.

As described above, the determination units 16a1, 16a2, ..., and 16aN and the determination units 16b1, 16b2, ..., and 16bM have basically different determination criteria, respectively.

In the example shown in FIG. 2, the control unit 16 is further provided with a determination unit 16c that comprehensively determines whether or not the autonomous driving control can be executed and an autonomous driving control unit 16d that executes the autonomous driving control.

When all the N determination units 16a1, 16a2, ..., and 16aN determine that the autonomous driving control can be engaged, the determination unit 16c determines that the autonomous driving control can be engaged.

When the determination unit 16c determines that the autonomous driving control can be engaged, the autonomous driving control unit 16d engages the autonomous driving control, which will be described later.

On the other hand, when at least one of the M determination units 16b1, 16b2, ..., and 16bM determines that the switching from the autonomous driving control to the manual driving should be executed, the determination unit 16c determines that the switching from the autonomous driving control to the manual driving should be executed. In this case, the autonomous driving control by the autonomous driving control unit 16d is deactivated, and the driver executes the manual driving. The determination by any of the M determination units 16b1, 16b2, ..., and 16bM that the switching from the autonomous driving control to the manual driving should be executed serves as a trigger to deactivate the autonomous driving control.

In the example shown in FIG. 2, the presentation unit 15 is provided with a control state notification unit 15a that notifies the driver of a fact that the autonomous driving control is in execution, and so forth.

If the autonomous driving control is engaged, the control state notification unit 15a displays, on the display of the HMI 7 for example, that the autonomous driving control is in execution.

If the switching from the autonomous driving control to the manual driving is executed, the control state notification unit 15a displays, on the display of the HMI 7 for example, that the autonomous driving control is not in execution (that is, the manual driving is in execution).

In the example shown in FIG. 2, an autonomous driving control engage trigger input unit 7a is provided in the HMI 7, for example.

Moreover, the autonomous driving control unit 16d has a "triggered engage mode" and an "automatic engage mode".

More specifically, in the triggered engage mode, the autonomous driving control unit 16d engages the autonomous driving control when an autonomous driving control engage trigger is input by the driver to the autonomous driving control engage trigger input unit 7a after the determination unit 16a determines that the autonomous driving control can be engaged.

In the automatic engage mode, the autonomous driving control unit 16d automatically engages the autonomous driving control when the determination unit 16a determines that the autonomous driving control can be engaged.

In the example shown in FIG. 2, the triggered engage mode and the automatic engage mode are switched according to a shift position of the shift lever 9. That is, in the example shown in FIG. 2, the shift lever 9 serves as a "switching unit" that switches between the triggered engage mode and the automatic engage mode.

In the example shown in FIG. 2, when the shift lever 9 is positioned at a shift position "D (DRIVE)" for example, the triggered engage mode is selected. On the other hand, when the shift lever 9 is positioned at a shift position "A (AUTOMATIC)", the automatic engage mode is selected. In the example shown in FIG. 2, for example, the shift position "A (AUTOMATIC)" for the automatic engage mode is provided adjacent to the shift position "D (DRIVE)" for the triggered engage mode.

Figure 3:
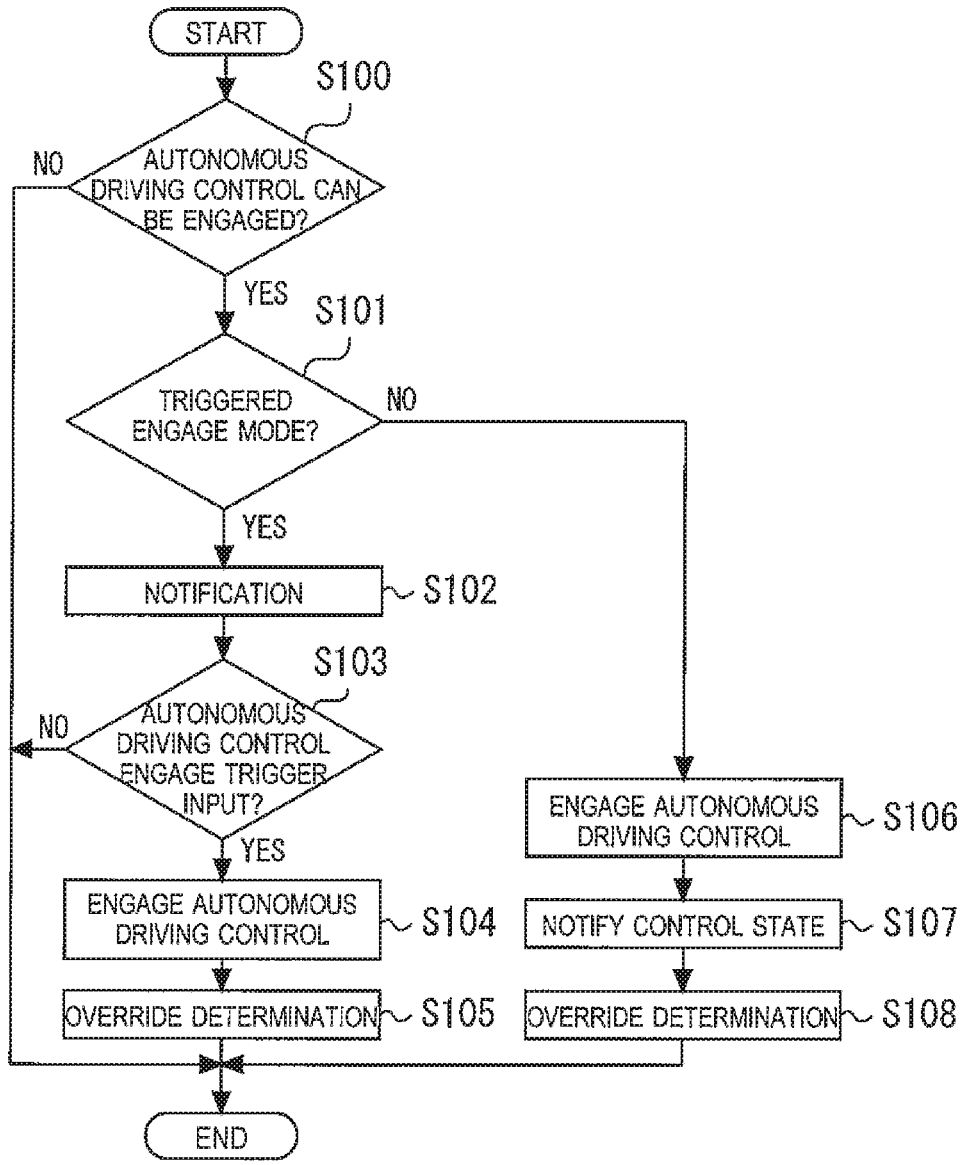
FIG. 3 is a flow chart for explaining engaging of a autonomous driving control in a triggered engage mode and engaging of the autonomous driving control in an automatic engage mode in the autonomous driving control apparatus according to the first embodiment.

FIG. 3 is a flow chart for explaining engaging of the autonomous driving control in the triggered engage mode and engaging of the autonomous driving control in the automatic engage mode in the autonomous driving control apparatus according to the first embodiment.

After the routine shown in FIG. 3 is started, the determination units 16a and 16c (see FIG. 2) first determine, at Step S100, whether the autonomous driving control can be engaged or not. If the determination results in "YES", then the process proceeds to Step S101. If the determination results in "NO", then the routine ends.

At Step S101, for example, the determination unit 16c (see FIG. 2) determines, based on the shift position of the shift lever 9 (see FIG. 2), whether the current mode is the triggered engage mode or the automatic engage mode.

When the shift lever 9 is positioned at the shift position "D (DRIVE)", the determination unit 16e determines that the current mode is the triggered engage mode, and the process proceeds to Step S102. When the shift lever 9 is positioned at the shift position "A (AUTOMATIC)", the determination unit 16c determines that the current mode is the automatic engage mode, and the process proceeds to Step S106.

At Step S102, for example, the HMI 7 (see FIGS. 1 and 2) uses the speaker and/or the display panel to notify the driver of a fact that the autonomous driving control can be engaged.

Next, at Step S103, it is determined whether or not the autonomous driving control engage trigger is input by the driver to the autonomous driving control engage trigger input unit 7a (see FIG. 2). If the determination results in "YES", then the process proceeds to Step S104. If the determination results in "NO", then the routine ends.

At Step S104, the autonomous driving control unit 16d (see FIG. 2) engages the autonomous driving control.

During execution of the autonomous driving control, an override determination is performed at Step S105.

More specifically, in the override determination at Step S105, for example, the ECU 10 (see FIG. 1) determines whether or not there is a driver's operation (specifically, a driver's operation different from the autonomous driving control) during the execution of the autonomous driving control. This determination is performed based on the operation amount of the driver's operation detected by the internal sensor 3 (see FIG. 1) for example.

When there is a driver's operation during the execution of the autonomous driving control, then the determination unit 16b (see FIG. 2) determines whether or not the operation amount of the driver's operation is equal to or more than the threshold calculated by the calculation unit 14 (see FIGS. 1 and 2).

If the operation amount of the driver's operation is equal to or more than the threshold, then it is determined that the driver desires switching from the autonomous driving control to the manual driving. In this case, the control unit 16 (see FIGS. 1 and 2) deactivates the autonomous driving control to make the switching from the autonomous driving control to the manual driving.

On the other hand, if the operation amount of the driver's operation is less than the threshold, then it is determined that the driver desires continuation of the autonomous driving control. In this case, the autonomous driving control by the autonomous driving control unit 16d (see FIG. 2) is maintained.

At Step S106, the autonomous driving control unit 16d (see FIG. 2) automatically engages the autonomous driving control without depending on a driver's operation.

Next, at Step S107, the control state notification unit 15a (see FIG. 2) displays, on the display of the HMI 7 for example, a fact that the autonomous driving control is in execution.

During execution of the autonomous driving control which is engaged automatically, an override determination is performed at Step S108.

More specifically, in the example shown in. FIG. 2, after the autonomous driving control is engaged automatically at Step S106 (see FIG. 3), the determination unit 16b determines, at Step S108 (see FIG. 3), whether or not to execute the switching from the autonomous driving control to the manual driving.

For example, the determination unit 16b1 determines whether or not to execute the switching from the autonomous driving control to the manual driving, based on the operation amount of steering by the driver of the vehicle during the autonomous driving control which is engaged automatically. The above-mentioned steering work amount is included in the operation amount.

For example, the determination unit 16b2 determines whether or not to execute the switching from the autonomous driving control to the manual driving, based on the operation amount of acceleration or deceleration by the driver of the vehicle during the autonomous driving control which is engaged automatically.

That is, the determination unit 16b determines whether or not to execute the switching from the autonomous driving control to the manual driving, based on the operation amount of the driving operation by the driver of the vehicle during the autonomous driving control which is engaged automatically.

Moreover, in the example shown in FIG. 2, the calculation unit 14 (see FIGS. 1 and 2) is provided with an adjustment unit 14a that adjusts the threshold used by the determination unit 16b for determining whether or not to execute the switching from the autonomous driving control to the manual driving.

Specifically, the adjustment unit 14a adjusts the threshold used for the determination in the determination unit 16b such that the switching from the autonomous driving control to the manual driving is more likely to be executed before an elapse of a predetermined period of time since the autonomous driving control is automatically engaged than after the elapse of the predetermined period of time.

More specifically, the threshold used for the determination in the determination unit 16b before the elapse of the predetermined period of time since the autonomous driving control is automatically engaged is adjusted by the adjustment unit 14a to be a first threshold. After the elapse of the predetermined period of time, the threshold used for the determination in the determination unit 16b is adjusted by the adjustment unit 14a to be a second threshold that is larger than the first threshold.

The second threshold may be preset to a fixed value. Alternatively, the second threshold may not be preset to a fixed value but set to be a function that varies depending on a vehicle running state such as a vehicle speed, a driver's state such as an awareness level or the like. Alternatively, the second threshold may be first preset to a fixed value and then varied depending on the vehicle running state such as the vehicle speed, the driver's state such as the awareness level or the like. The second threshold is the threshold used for determining whether there is an override or not. At least the second threshold is determined independently of timings of engaging and deactivating the autonomous driving control.

In the example shown in FIG. 2, the second threshold is set such that there is a moment when the operation amount of the driver's operation exceeds the second threshold during a period in which the manual driving by the driver is in execution.

In the example shown in FIGS. 2 and 3 to which the autonomous driving control apparatus of the first embodiment is applied, the threshold used for the override determination at Step S105 (see FIG. 3) and the second threshold used for the override determination at Step S108 (see FIG. 3) are set to the same value. Alternatively, in another example to which the autonomous driving control apparatus of the first embodiment is applied, the second threshold used for the override determination at Step S108 is set to be smaller than the threshold used for the override determination at Step S105.

That is, in the other example to which the autonomous driving control apparatus of the first embodiment is applied, the switching from the autonomous driving control to the manual driving is more likely to be executed even after the elapse of the predetermined period since the autonomous driving control is automatically engaged than in the case where the autonomous driving control is engaged in accordance with the driver's intention.

Figure 4:
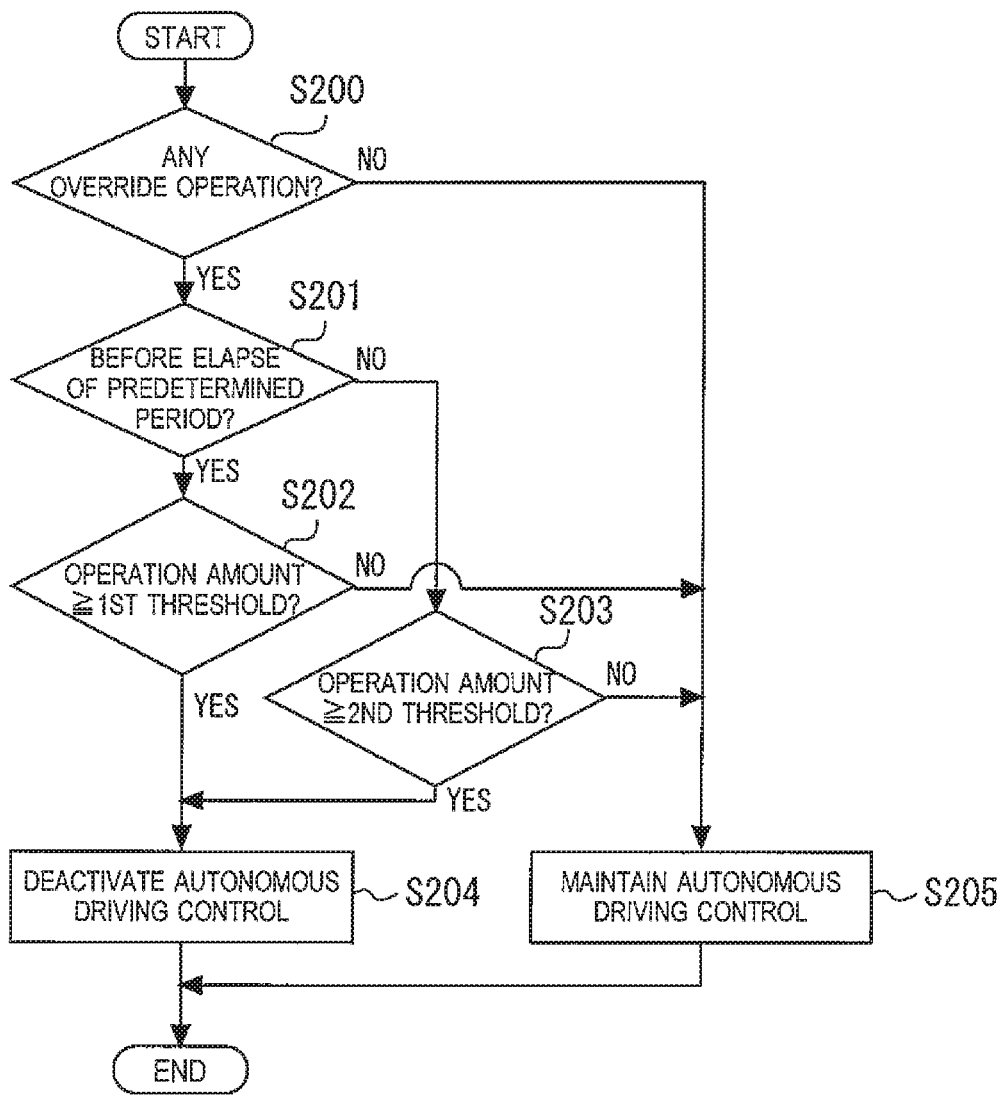
FIG. 4 is a flow chart for explaining override determination at Step S108 in FIG. 3.

FIG. 4 is a flow chart for explaining the override determination at Step S108 in FIG. 3.

After the routine shown in FIG. 4 is started, the ECU 10 (see FIG. 1) for example first determines, at Step S200, whether or not there is a driver's operation (specifically, a driver's operation different from the autonomous driving control) during the execution of the autonomous driving control. This determination is performed based on the operation amount of the driver's operation detected by the internal sensor 3 (see FIG. 1) for example. The above-mentioned steering work amount is included in the operation amount. If the determination results in "YES", then the process proceeds to Step S201. If the determination results in "NO", then the process proceeds to Step S205.

At Step S201, the ECU 10 for example determines whether or not a predetermined period of time has elapsed since the autonomous driving control is automatically engaged. If the determination results in "YES", then the process proceeds to Step S202. If the determination results in "NO", then the process proceeds to Step S203.

At Step S202, the determination unit 16b (see FIG. 2) determines whether or not the operation amount of the driver's operation is equal to or more than the first threshold. If the determination results in "YES", then it is determined that the driver desires the switching from the autonomous driving control to the manual driving, and the process proceeds to Step S204. On the other hand, if the determination results in "NO", it is determined that the driver desires continuation of the autonomous driving control, and the process proceeds to Step S205.

At Step S203, the determination unit 16b (see FIG. 2) determines whether or not the operation amount of the driver's operation is equal to or more than the second threshold. If the determination results in "YES", then it is determined that the driver desires the switching from the autonomous driving control to the manual driving, and the process proceeds to Step S204. On the other hand, if the determination results in "NO", it is determined that the driver desires continuation of the autonomous driving control, and the process proceeds to Step S205.

In the example shown in FIG. 4, the first threshold at Step S202 is set to be smaller than the second threshold at Step S203, as described above. That is, in the example shown in FIG. 4, the adjustment unit 14a (see FIG. 2) adjusts the threshold used for the determination in the determination unit 16b (see FIG. 2) such that the switching from the autonomous driving control to the manual driving is more likely to be executed before the elapse of the predetermined period of time since the autonomous driving control is automatically engaged than after the elapse of the predetermined period of time since the autonomous driving control is automatically engaged (i.e. the determination at Step S202 is more likely to result in "YES"). Thus, the first threshold at Step S202 is set to be smaller than the second threshold at Step S203.

In the example shown in FIG. 4, for example, the predetermined period of time is 2 seconds, and the first threshold is set to be one-third of the second threshold.

At Step S204, the autonomous driving control is deactivated, and the switching from the autonomous driving control to the manual driving is executed.

At Step S205, the autonomous driving control by the autonomous driving control unit 16d (see FIG. 2) is maintained.

In the example shown in FIG. 4, the first threshold is fixed to a constant value until the elapse of the predetermined period of time since the autonomous driving control is automatically engaged. Alternatively, in another example, the first threshold at the time when the autonomous driving control is automatically engaged is set to for example one-third of the second threshold, and then the first threshold is gradually changed to be equal to the second threshold at the time when the predetermined period of time has elapsed since the autonomous driving control is automatically engaged.

As described above, in the example shown in FIG. 2 to which the autonomous driving control apparatus of the first embodiment is applied, for example, the triggered engage mode is selected when the shift lever 9 is positioned at the shift position "D (DRIVE)", and the automatic engage mode is selected when the shift lever 9 is positioned at the shift position "A (AUTOMATIC)".

That is, according the example shown in FIG. 2 to which the autonomous driving control apparatus of the first embodiment is applied, the driver can easily perform the mode switching between the triggered engage mode and the automatic engage mode without looking at the driver's hand during driving. Furthermore, after the mode switching operation, whether or not the current mode is the automatic engage mode where the autonomous driving control can be automatically engaged is indicated for the driver by the shift position "A (AUTOMATIC)" of the shift lever 9. Therefore, the driver can determine whether or not the current mode is the automatic engage mode where the autonomous driving control can be automatically engaged, only by touching the familiar shift lever 9 without looking at the shift lever 9.

That is, according the example shown in FIG. 2 to which the autonomous driving control apparatus of the first embodiment is applied, the driver executing the manual driving can determine more safely whether or not the current mode is the automatic engage mode where the autonomous driving control can be automatically engaged, as compared with a case where a means other than the shift lever 9 indicates for the driver whether or not the current mode is the automatic engage mode where the autonomous driving control can be automatically engaged. The driver who has recognized that the current mode is the automatic engage mode can beforehand prepare to execute the switching from the autonomous driving control to the manual driving, after the autonomous driving control is automatically engaged at Step S106 (see FIG. 3).

As described above, in the example shown in FIG. 2 to which the autonomous driving control apparatus of the first embodiment is applied, the driver can determine whether the current mode is the automatic engage mode or the triggered engage mode, only by touching the familiar shift lever 9 without looking at the shift lever 9.

Alternatively, in another example to which the autonomous driving control apparatus of the first embodiment is applied, whether the current mode is the automatic engage mode or the triggered engage mode is notified to the driver by displaying it on the display of the HMI 7 (see FIG. 1) or audio-outputting it from the speaker of the HMI 7.

More specifically, in the other example to which the autonomous driving control apparatus of the first embodiment is applied, the notification of the automatic engage mode to the driver is more emphasized than the notification of the triggered engage mode to the driver. For example, when whether the current mode is the automatic engage mode or the triggered engage mode is displayed on the display of the HMI 7, a parameter such as chromatic luminosity, drawing size, color type (e.g. eye-catching color and the like), blink on/off, blinking speed and the like is designed to be different between the automatic engage mode and the triggered engage mode. Alternatively, the number of means for notifying the driver of whether the current mode is the automatic engage mode or the triggered engage mode may be different between the automatic engage mode and the triggered engage mode. For example, the triggered engage mode is notified to the driver only by displaying it on the display of the HMI 7, while the automatic engage mode is notified to the driver by displaying it on the display of the HMI 7, audio-outputting it from the speaker of the HMI 7, and vibrating the steering wheel 30 (see FIG. 7).

According to the example shown in FIG. 3 to which the autonomous driving control apparatus of the first embodiment is applied, in the case of the automatic engage mode, it is not necessary for the driver to input the autonomous driving control engage trigger, and the autonomous driving control is engaged automatically at Step S106.

Therefore, according to the example shown in FIG. 3 to which the autonomous driving control apparatus of the first embodiment is applied, it is possible to engage the autonomous driving control even at a time when the driver has no time to input the autonomous driving control engage trigger, other than a time when the driver has time such as a time when the vehicle is running on a straight road, stopping, and so forth. As a result, the driver's desire to rely on the autonomous driving control can be satisfied.

Moreover, according to the example shown in FIG. 3 to which the autonomous driving control apparatus of the first embodiment is applied, there is no need to input the autonomous driving control engage trigger in the case of the automatic engage mode. Therefore, it is not necessary for the driver to continue checking the determination result of Step S100 in order to input the autonomous driving control engage trigger.

That is to say, the autonomous driving control apparatus according to the first embodiment is provided with the automatic engage mode that automatically engages the autonomous driving control. Therefore, it is possible to automatically engage the autonomous driving control at Step S106 (see FIG. 3) without the input of the autonomous driving control engage trigger by the driver.

Meanwhile, the autonomous driving control apparatus according to the first embodiment is provided also with the triggered engage mode separately from the automatic engage mode. The triggered engage mode engages the autonomous driving control at Step S104 (see FIG. 3) when the autonomous driving control engage trigger is input by the driver after it is determined at Step S100 (see FIG. 3) that the autonomous driving control can be engaged. That is, in the triggered engage mode, the autonomous driving control is not engaged unless the autonomous driving control engage trigger is input by the driver.

Furthermore, the autonomous driving control apparatus according to the first embodiment is provided with the shift lever 9 (see FIGS. 1 and 2) that serves as the switching unit for switching between the triggered engage mode and the automatic engage mode.

That is, according to the autonomous driving control apparatus of the first embodiment, when the driver does not desire the autonomous driving control to be engaged automatically, for example, the driver locates the shift lever 9 at the shift position "D (DRIVE)" to select the triggered engage mode. As a result, the autonomous driving control is prevented from being engaged automatically. The autonomous driving control is engaged at Step S104 when the autonomous driving control engage trigger is input by the driver to the autonomous driving control engage trigger input unit 7*a* (see FIG. 2) after it is determined at Step S100 that the autonomous driving control can be engaged.

Thus, according to the autonomous driving control apparatus of the first embodiment, it is possible to suppress a problem that the autonomous driving control is engaged automatically even though the driver desires to execute the manual driving. That is, it is possible to meet both the demand of the driver who desires the autonomous driving control to be engaged without the input of the autonomous driving control engage trigger by the driver and the demand of the driver who does not desire the autonomous driving control to be engaged automatically. In other words, the driver can switch and use the different two modes: the triggered engage mode where the driver determines a timing of engaging the autonomous driving control; and the automatic engage mode where the autonomous driving control apparatus determines the timing of engaging the autonomous driving control.

When the autonomous driving control is engaged automatically at Step S106 (see FIG. 3) even though the driver desires to execute the manual driving, the driver desires to execute the switching from the autonomous driving control to the manual driving. Here, if it is hard to execute the switching from the autonomous driving control to the manual driving, the driver cannot execute the manual driving even though the driver desires to execute the manual driving, which is not preferable.

In view of the above, according to the autonomous driving control apparatus of the first embodiment, before an elapse of a predetermined period of time since the autonomous driving control is automatically engaged at Step S106, the switching from the autonomous driving control to the manual driving is executed at Step S204 (see FIG. 4) when it is determined at Step S202 (see FIG. 4) that the operation amount of the driver's operation is equal to or more than the first threshold which is smaller than the second threshold being the threshold used after the elapse of the predetermined period of time.

That is, according to the autonomous driving control apparatus of the first embodiment, before the elapse of the predetermined period of time since the autonomous driving control is automatically engaged at Step S106, the driver can execute the switching from the autonomous driving control to the manual driving by a smaller operation amount as compared with that after the elapse of the predetermined period of time. In other words, the switching from the autonomous driving control to the manual driving is more likely to be executed before the elapse of the predetermined period of time since the autonomous driving control is automatically engaged at Step S106 than after the elapse of the predetermined period of time.

Thus, according to the autonomous driving control apparatus of the first embodiment, before the elapse of the predetermined period of time since the autonomous driving control is automatically engaged at Step S106, the driver can execute the manual driving more easily and quickly than after the elapse of the predetermined period of time. As a result, it is possible to suppress the problem that the driver cannot execute the manual driving even though the driver desires to execute the manual driving.

Furthermore, in the example shown in FIGS. 2 and 3 to which the autonomous driving control apparatus of the first embodiment is applied, the control state notification unit 15a (see FIG. 2) serving as a notification device that notifies, at Step S107 (see FIG. 3), the driver of the fact that the autonomous driving control has been engaged automatically at Step S106 (see FIG. 3) is provided. Therefore, in the example shown in FIGS. 2 and 3 to which the autonomous driving control apparatus of the first embodiment is applied, the possibility that the driver does not aware the automatic engaging of the autonomous driving control can be reduced.

In another example to which the autonomous driving control apparatus of the first embodiment is applied, the control state notification unit 15a (see FIG. 2) serving as a notification device that notifies the driver of the fact that the autonomous driving control has been engaged automatically may be omitted.

In the example shown in FIGS. 2 and 4 to which the autonomous driving control apparatus of the first embodiment is applied, the threshold used by the determination unit 16b (see FIG. 2) for the determination at Steps S202 and S203 (see FIG. 4) is adjusted by the adjustment unit 14a (see FIG. 2) to be changed between before and after the elapse of the predetermined period of time, and the control state notification unit 15a (see FIG. 2) serving as a notification device that notifies the driver of the change in the threshold is provided.

That is, in the example shown in FIGS. 2 and 4 to which the autonomous driving control apparatus of the first embodiment is applied, the driver is notified of the fact that the threshold used for determining whether or not to execute the switching from the autonomous driving control to the manual driving is smaller before the elapse of the predetermined period of time since the autonomous driving control is engaged automatically at Step S106 (see FIG. 3) than after the elapse of the predetermined period of time. Therefore, even when the autonomous driving control is automatically engaged against the driver's will, the driver can easily execute the switching from the autonomous driving control to the manual driving during the predetermined period of time, which provides a feeling of relief to the driver.

For example, sounds, visual display, vibration of the steering wheel 30 (see FIG. 7), and the like can be used as a means for notifying that the threshold before the elapse of the predetermined period of time is different from the threshold after the elapse of the predetermined period of time.

In another example to which the autonomous driving control apparatus of the first embodiment is applied, the control state notification unit 15a serving as a notification device that notifies the driver of the change in the threshold may be omitted.

In the example shown in FIGS. 1, 2 and 4 to which the autonomous driving control apparatus of the first embodiment is applied, the status of the driver is monitored by the monitor device 8 (sec FIG. 1). Moreover, the adjustment unit 14a (see FIG. 2) changes the length of the predetermined period of time at Step S201 (see FIG. 4) depending on the status of the driver monitored by the monitor device 8.

More specifically, in the example shown in FIGS. 1, 2 and 4 to which the autonomous driving control apparatus of the first embodiment is applied, when it is detected by the monitor device 8 that the driver is not yet ready for stating the manual driving, the predetermined period of time during which the switching from the autonomous driving control to the manual driving can be easily executed is extended. On the other hand, for example, when it is detected by the monitor device 8 that the driver has no intention to execute the manual driving, the predetermined period of time during which the switching from the autonomous driving control to the manual driving can be easily executed is shortened.

Therefore, according to the example shown in FIGS. 1, 2 and 4 to which the autonomous driving control apparatus of the first embodiment is applied, the possibility that the switching from the autonomous driving control to the manual driving is executed against the driver's will and the possibility that the autonomous driving control is continued against the driver's will can be reduced as compared with a case where the length of the predetermined period of time is not changed.

In another example to which the autonomous driving control apparatus of the first embodiment is applied, the monitor device 8 may be omitted, and the predetermined period of time may not be changed.

In the example shown in FIGS. 2 and 3 to which the autonomous driving control apparatus of the first embodiment is applied, the determination units 16a and 16c (see FIG. 2) determines, at Step S100 (see FIG. 3), whether the autonomous driving control can be engaged or not, in both cases where the automatic engage mode is selected by the driver and where the triggered engage mode is selected by the driver. That is, a determination criterion used for determining whether the autonomous driving control can be engaged or not when the automatic engage mode is selected is designed to be equal to a determination criterion used for determining whether the autonomous driving control can be engaged or not when the triggered engage mode is selected.

In another example to which the autonomous driving control apparatus of the first embodiment is applied, the determination criterion used for determining that the autonomous driving control can be engaged when the automatic engage mode is selected is designed to be less likely to be met than the determination criterion used for determining that the autonomous driving control can be engaged when the triggered engage mode is selected. That is, according to the other example to which the autonomous driving control apparatus of the first embodiment is applied, the determination units 16a and 16c are less likely to determine that the autonomous driving control can be engaged when the automatic engage mode is selected than when the triggered engage mode is selected. In other words, the determination units 16a and 16c are more likely to determine that the autonomous driving control can be engaged when the triggered engage mode is selected than when the automatic engage mode is selected.

Therefore, according to the other example to which the autonomous driving control apparatus of the first embodiment is applied, even in a driving situation where the autonomous driving control cannot be engaged when the automatic engage mode is selected, the autonomous driving control unit 16d (see FIG. 2) can engage the autonomous driving control when the driver selects the triggered engage mode and inputs the autonomous driving control engage trigger through the autonomous driving control engage trigger input unit 7a (see FIG. 2).

Alternatively, in the other example to which the autonomous driving control apparatus of the first embodiment is applied, in a driving situation where the autonomous driving control cannot be engaged when the automatic engage mode is selected while the autonomous driving control can be engaged when the triggered engage mode, the autonomous driving control unit 16d (see FIG. 2) may engage the autonomous driving control when the driver selects the automatic engage mode and inputs the autonomous driving control engage trigger through the autonomous driving control engage trigger input unit 7a (see FIG. 2).

Furthermore, according to the other example to which the autonomous driving control apparatus of the first embodiment is applied, it is more likely to be determined that the autonomous driving control can be engaged when the triggered engage mode is selected than when the automatic engage mode is selected. Therefore, a period of time when it is determined that the autonomous driving control can be engaged becomes longer when the triggered engage mode is selected than when the automatic engage mode is selected.

As a result, according to the other example to which the autonomous driving control apparatus of the first embodiment is applied, the driver has enough time for inputting the autonomous driving control engage trigger. The autonomous driving control is more likely to be engaged at Step S104 (see FIG. 3) according to the driver's demand.

Let us assume a case where it is more likely to be determined that the autonomous driving control can be engaged when the automatic engage mode is selected. In this case, the autonomous driving control may be frequently engaged automatically, even when the vehicle behavior is likely to be disturbed such as when the vehicle is running on a road having a large curvature, for example. As a result, the driver may have a sense of anxiety (erroneous impression) that the vehicle behavior tends to be disturbed when the autonomous driving control is engaged automatically.

In view of the above, according to the other example to which the autonomous driving control apparatus of the first embodiment is applied, it is less likely to be determined that the autonomous driving control can be engaged when the automatic engage mode is selected than when the triggered engage mode is selected, as described above.

Therefore, according to the other example to which the autonomous driving control apparatus of the first embodiment is applied, it is possible to suppress the possibility that the vehicle behavior is disturbed when the autonomous driving control is automatically engaged. It is thus possible to reduce the possibility that the driver has a sense of anxiety (erroneous impression) that the vehicle behavior tends to be disturbed when the autonomous driving control is automatically engaged.

In the example shown in FIGS. 1 and 2 to which the autonomous driving control apparatus of the first embodiment is applied, as described above, the shift position "D (DRIVE)" of the shift lever 9 is associated with the triggered engage mode and the shift position "A (AUTOMATIC)" of the shift lever 9 is associated with the automatic engage mode. In another example to which the autonomous driving control apparatus of the first embodiment is applied, for example, a shift position "T (TRIGGER)" is newly provided adjacent to the shift position "A (AUTOMATIC)" or the shift position "D (DRIVE)". In this case, the shift position "D (DRIVE)" of the shift lever 9 is associated with an autonomous driving control OFF (invalid) mode, the shift position "A (AUTOMATIC)" of the shift lever 9 is associated with the automatic engage mode, and the shift position "T (TRIGGER)" of the shift lever 9 is associated with the triggered engage mode.

The determination of whether or not to deactivate the autonomous driving control is not limited to the above-mentioned example where the operation amount of the driver's operation is compared with the threshold. In a modification example of the present embodiment, whether or not to deactivate the autonomous driving control is determined based on presence or absence of the driver's operation. Such the driver's operation is exemplified by a direction signal (blinker) operation by the driver.

In this modification example, after the elapse of the predetermined period of time at Step S201 (see FIG. 4) since the autonomous driving control is engaged, the determination unit 16b (see FIG. 2) does not determine that the switching from the autonomous driving control to the manual driving should be executed, even when the driver performs the direction signal operation. On the other hand, before the elapse of the predetermined period of time, the determination unit 16b determines that the switching from the autonomous driving control to the manual driving should be executed, when the driver performs the direction signal operation. In other words, according to the modification example of the present embodiment, the switching from the autonomous driving control to the manual driving is more likely to be executed before the elapse of the predetermined period of time.

Second Embodiment

A second embodiment of the autonomous driving control apparatus according to the present invention will be described below.

The autonomous driving control apparatus of the second embodiment is configured similarly to the autonomous driving control apparatus of the first embodiment described above, except for points which, will be described below. Therefore, according to the autonomous driving control apparatus of the second embodiment, the same effects as in the case of the autonomous driving control apparatus of the first embodiment described above can be obtained, except for points which will be described below.

Figure 5A:
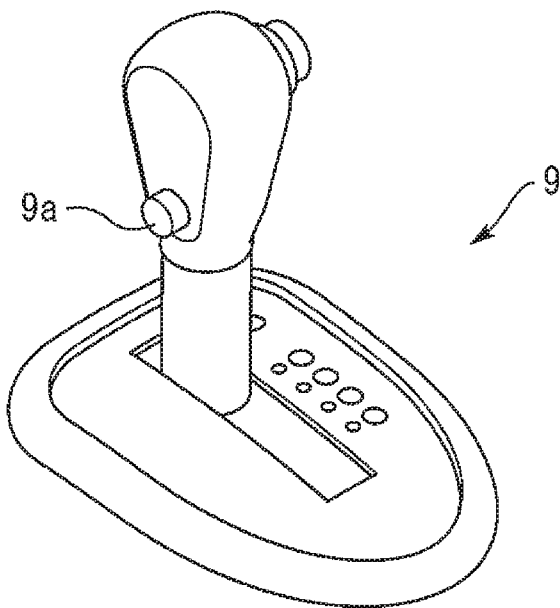
FIGS. 5A and 5B are diagrams showing a shift lever 9 of an autonomous driving control apparatus according to a second embodiment.
Figure 5B:
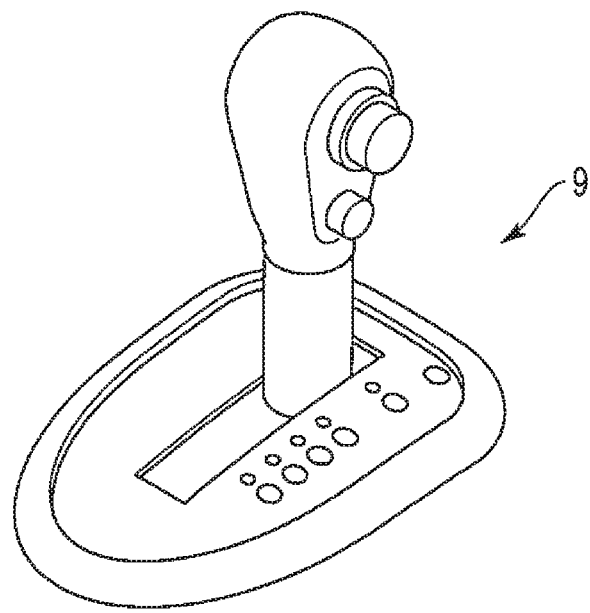

FIGS. 5A and 5B are diagrams showing the shift lever 9 of the autonomous driving control apparatus according to the second embodiment. Specifically, FIG. 5A is a diagram showing the shift lever 9 of the autonomous driving control apparatus of the second embodiment seen from a passenger seat side, and FIG. 5B is a diagram showing the shift lever 9 of the autonomous driving control apparatus of the second embodiment seen from a driver's seat side.

In the autonomous driving control apparatus of the first embodiment, as described above, the triggered engage mode is selected when the shift lever 9 serving as the switching unit is positioned at the shift position "D (DRIVE)", and the automatic engage mode is selected when the shift lever 9 is positioned at the shift position "A (AUTOMATIC)".

On the other hand, in the example to which the autonomous driving control apparatus of the second embodiment is applied, as shown in FIG. 5A, the shift lever 9 is provided with a mode switching button 9a serving as the switching unit. For example, the triggered engage mode is selected when the mode switching button 9a of the shift lever 9 is in a projecting state, and the automatic engage mode is selected when the mode switching button 9a of the shift lever 9 is in a pushed-down state.

In another example to which the autonomous driving control apparatus of the second embodiment is applied, a projection amount of the mode switching button 9a of the shift lever 9 (see FIG. 5A) is designed to be equal between when the triggered engage mode is selected and when the automatic engage mode is selected.

In the other example to which the autonomous driving control apparatus of the second embodiment is applied, the switching between the triggered engage mode and the automatic engage mode is performed every time the mode switching button 9a is pushed down.

Third Embodiment

A third embodiment of the autonomous driving control apparatus according to the present invention will be described below.

The autonomous driving control apparatus of the third embodiment is configured similarly to the autonomous driving control apparatus of the first embodiment described above, except for points which will be described below. Therefore, according to the autonomous driving control apparatus of the third embodiment, the same effects as in the case of the autonomous driving control apparatus of the first embodiment described above can be obtained, except for points which will be described below.

FIG. 6 is a diagram showing a mode switching pedal 20 and so forth of the autonomous driving control apparatus according to the third embodiment. In FIG. 6, "FM" denotes a floor mat.

In the example shown in FIG. 6 to which the autonomous driving control apparatus of the third embodiment is applied, for example, the triggered engage mode is selected when the mode switching pedal 20 serving as the switching unit is not pressed down (i.e. when the mode switching pedal 20 is in a state shown in FIG. 6), and the automatic engage mode is selected when the mode switching pedal 20 is pressed down.

According to the example shown in FIG. 6 to which the autonomous driving control apparatus of the third embodiment is applied, the mode switching pedal 20 that can be operated by a left foot of the driver is used as the switching unit for switching between the triggered engage mode and the automatic engage mode. Therefore, according to the example shown in FIG. 6 to which the autonomous driving control apparatus of the third embodiment is applied, it is possible to suppress influence of the switching operation between the triggered engage mode and the automatic engage mode on the vehicle driving operation and thus to suppress a negative effect on the vehicle behavior.

Fourth Embodiment

A fourth embodiment of the autonomous driving control apparatus according to the present invention will be described below.

The autonomous driving control apparatus of the fourth embodiment is configured similarly to the autonomous driving control apparatus of the first embodiment described above, except for points which will be described below. Therefore, according to the autonomous driving control apparatus of the fourth embodiment, the same effects as in the case of the autonomous driving control apparatus of the first embodiment described above can be obtained, except for points which will be described below.

Figure 7:
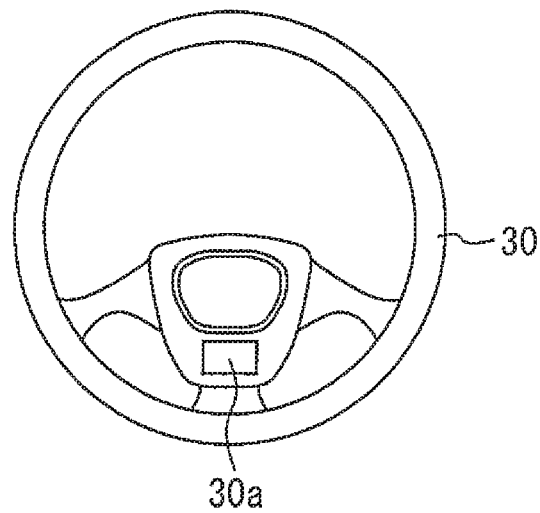
FIG. 7 is a diagram showing a steering wheel 30 of the autonomous driving control apparatus according to a fourth embodiment.

FIG. 7 is a diagram showing a steering wheel 30 of the autonomous driving control apparatus according to the fourth embodiment.

In the example shown in FIG. 7 to which the autonomous driving control apparatus of the fourth embodiment is applied, the steering wheel 30 is provided with a mode switching button 30a serving as the switching unit. For example, the triggered engage mode is selected when the mode switching button 30a of the steering wheel 30 is in a projecting state, and the automatic engage mode is selected when the mode switching button 30a of the steering wheel 30 is in a pushed-down state.

In another example to which the autonomous driving control apparatus of the fourth embodiment is applied, a projection amount of the mode switching button 30a of the steering wheel 30 (see FIG. 7) is designed to be equal between when the triggered engage mode is selected and when the automatic engage mode is selected.

In the other example to which the autonomous driving control apparatus of the fourth embodiment is applied, the switching between the triggered engage mode and the automatic engage mode is performed every time the mode switching button 30a is pushed down (or touched).

Fifth Embodiment

A fifth embodiment of the autonomous driving control apparatus according to the present invention will be described below.

The autonomous driving control apparatus of the fifth embodiment is configured similarly to the autonomous driving control apparatus of the first embodiment described above, except for points which will be described below. Therefore, according to the autonomous driving control apparatus of the fifth embodiment, the same effects as in the case of the autonomous driving control apparatus of the first embodiment described above can be obtained, except for points which will be described below.

Figure 8:
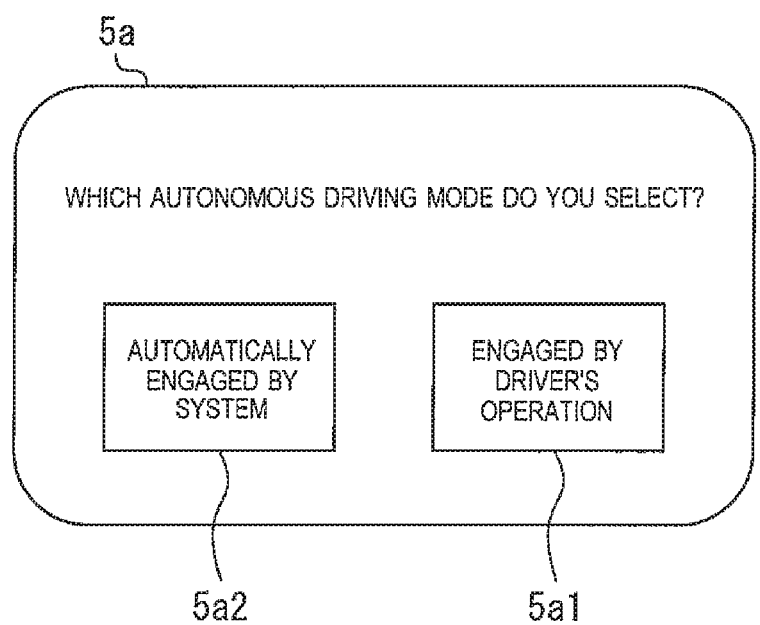
FIG. 8 is a diagram showing a display 5a of a navigation system 5 of the autonomous driving control apparatus according to a fifth embodiment.

FIG. 8 is a diagram showing a display 5a of the navigation system 5 (see FIG. 1) of the autonomous driving control apparatus according to the fifth embodiment.

According to the example shown in FIG. 8 to which the autonomous driving control apparatus of the fifth embodiment is applied, for example, a triggered engage mode select button 5a1 and an automatic engage mode select button 5a2 are displayed by a GUI (Graphical User Interface) on the display 5a serving as the switching unit. The triggered engage mode is selected when the driver touches the triggered engage mode select button 5a1, and the automatic engage mode is selected when the driver touches the automatic engage mode select button 5a2.

Sixth Embodiment

A sixth embodiment of the autonomous driving control apparatus according to the present invention will be described below.

The autonomous driving control apparatus of the sixth embodiment is configured similarly to the autonomous driving control apparatus of the first embodiment described above, except for points which will be described below. Therefore, according to the autonomous driving control apparatus of the sixth embodiment, the same effects as in the case of the autonomous driving control apparatus of the first embodiment described above can be obtained, except for points which will be described below.

In the example shown in FIG. 2 to which the autonomous driving control apparatus of the first embodiment is applied, the shift lever 9 serving as the switching unit and the autonomous driving control engage trigger input unit 7a used for inputting the autonomous driving control engage trigger are provided separately from each other. The triggered engage mode is selected when the shift lever 9 is positioned at the shift position "D (DRIVE)", and the automatic engage mode is selected when the shift lever 9 is positioned at the shift position "A (AUTOMATIC)".

On the other hand, according to the example to which the autonomous driving control apparatus of the sixth embodiment is applied, the autonomous driving control engage trigger input unit 7a (see FIG. 2) has both the function of inputting the autonomous driving control engage trigger and the function of the switching unit for switching between the triggered engage mode and the automatic engage mode.

In the example to which the autonomous driving control apparatus of the sixth embodiment is applied, for example, the triggered engage mode is selected in a default state of the autonomous driving control apparatus 100 (see FIG. 1). Then, the automatic engage mode is selected when the driver performs a different operation, which is different from the operation for inputting the autonomous driving control engage trigger, with respect to the autonomous driving control engage trigger input unit 7*a*. For example, after the automatic engage mode is selected, the autonomous driving control is engaged at Step S106 (see FIG. 3). After that, when the autonomous driving control is deactivated at Step S204 (see FIG. 4), the mode returns back to the triggered engage mode.

An example of the above-mentioned different operation is as follows. When inputting the autonomous driving control engage trigger, the driver presses the autonomous driving control engage trigger input unit 7*a* for a first period of time. When the autonomous driving control engage trigger input unit 7*a* is pressed for a second period of time longer than the first period of time, the switching from the triggered engage mode to the automatic engage mode is executed.

Another example of the above-mentioned different operation is as follows. When inputting the autonomous driving control engage trigger, the driver presses the autonomous driving control engage trigger input unit 7*a* with a first force. When the autonomous driving control engage trigger input unit 7*a* is pressed with a second force greater than the first force, the switching from the triggered engage mode to the automatic engage mode is executed.

Still another example of the above-mentioned different operation is as follows. When the driver single-clicks on the autonomous driving control engage trigger input unit 7*a*, it is determined that the autonomous driving control engage trigger is input. When the driver double-clicks on the autonomous driving control engage trigger input unit 7*a*, it is determined that an operation for switching from the triggered engage mode to the automatic engage mode is executed.

In view of above, according to each example to which the autonomous driving control apparatus of the sixth embodiment is applied, when the driver once performs the different operation, which is different from the operation for inputting the autonomous driving control engage trigger, with respect to the autonomous driving control engage trigger input unit 7*a*, the autonomous driving control by the automatic engage mode is executed only once. After that, the mode returns back to the triggered engage mode.

Seventh Embodiment

In a seventh embodiment of the autonomous driving control apparatus according to the present invention, some of the first to sixth embodiments and examples of the autonomous driving control apparatus according to the present invention described above can be combined with each other as appropriate.

What is claimed is:

1. An autonomous driving control apparatus that executes an autonomous driving control of a vehicle, the autonomous driving control apparatus comprising:
 a control device that determines whether the autonomous driving control can be engaged or not, and engages the autonomous driving control in a triggered engage mode or an automatic engage mode;
 a human machine interface that receives a triggered engage mode input; and
 a switching device that switches between the triggered engage mode and the automatic engage mode,
 wherein when the triggered engage mode is selected, the control device engages the autonomous driving control in response to receiving the triggered engage mode input through the human machine interface after determining that the autonomous driving control can be engaged, and
 wherein when the automatic engage mode is selected by the switching device, the control device automatically engages the autonomous driving control in response to determining that the autonomous driving control can be engaged.

2. The autonomous driving control apparatus according to claim 1, wherein
 a determination criterion used by the control device for determining that the autonomous driving control can be engaged is less likely to be met when the automatic engage mode is selected than when the triggered engage mode is selected.

3. The autonomous driving control apparatus according to claim 1, wherein before an elapse of a predetermined period of time after the autonomous driving control is automatically engaged in the automatic engage mode, the control device deactivates the autonomous driving control when an operation amount of at least one of a steering operation, an acceleration operation, and a braking operation, performed by a driver of the vehicle, is equal to or more than a first threshold, and
 wherein after the elapse of the predetermined period of time after the autonomous driving control is automatically engaged in the automatic engage mode, the control device deactivates the autonomous driving control when the operation amount is equal to or more than a second threshold larger than the first threshold.

4. A method, comprising:
 receiving, by an electronic control unit (ECU) of a vehicle and from a switching device of the vehicle, information identifying whether a first mode or a second mode is selected;
 determining, by the ECU of the vehicle, that autonomous driving control of the vehicle can be engaged; and
 engaging, by the ECU of the vehicle, the autonomous driving control of the vehicle based on determining that the autonomous driving control of the vehicle can be engaged and based on the information identifying whether the first mode or the second mode is selected,
 wherein, in a situation where the first mode is selected, the ECU automatically engages the autonomous driving control of the vehicle based on determining that the autonomous driving control of the vehicle can be engaged, and
 wherein, in another situation where the second mode is selected, the ECU engages the autonomous driving control based on determining that the autonomous driving control of the vehicle can be engaged and based on receiving, via a human machine interface of the vehicle, an input that identifies that the autonomous driving control of the vehicle is to be engaged.

5. The method of claim 4, further comprising:
 deactivating, by the ECU of the vehicle, the autonomous driving control of the vehicle based on an operation amount of at least one of a steering operation, an acceleration operation, and a braking operation, performed by a user of the vehicle, satisfying a first threshold within a first predetermined period of time of the autonomous driving control of the vehicle being engaged, or deactivating, by the ECU of the vehicle, the autonomous driving control of the vehicle based on another operation amount, performed by the user of the vehicle, satisfying a second threshold, that is different than the first threshold, within a second predetermined period of time of the autonomous driving control of the vehicle being engaged.

6. The method of claim 4, further comprising:

receiving, by the ECU of the vehicle, information from a plurality of sensors of the vehicle; and wherein determining that the autonomous driving control of the vehicle can be engaged comprises determining that the autonomous driving control of the vehicle can be engaged based on the information from the plurality of sensors.

7. The method of claim 4, wherein the switching device is a shift lever.

8. The method of claim 4, wherein the switching device is a pedal of the vehicle.

9. The method of claim 4, wherein the switching device is associated with a steering wheel of the vehicle.

10. The method of claim 4, wherein the switching device includes a graphical user interface.

* * * * *